US010769731B2

(12) United States Patent
Havilio

(10) Patent No.: US 10,769,731 B2
(45) Date of Patent: Sep. 8, 2020

(54) ADDING PAID LINKS TO MEDIA CAPTIONS IN A SOCIAL NETWORKING SYSTEM

(71) Applicant: Facebook, Inc., Menlo Park, CA (US)

(72) Inventor: Amir Mesguich Havilio, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 241 days.

(21) Appl. No.: 15/007,118

(22) Filed: Jan. 26, 2016

(65) Prior Publication Data

US 2017/0213297 A1 Jul. 27, 2017

(51) Int. Cl.
*G06Q 30/00* (2012.01)
*G06Q 50/00* (2012.01)
*G06Q 30/02* (2012.01)
*G06F 16/955* (2019.01)

(52) U.S. Cl.
CPC ......... *G06Q 50/01* (2013.01); *G06F 16/9566* (2019.01); *G06Q 30/0273* (2013.01)

(58) Field of Classification Search
None
See application file for complete search history.

(56) References Cited

U.S. PATENT DOCUMENTS

| | | | | |
|---|---|---|---|---|
| 6,976,214 B1* | 12/2005 | Bates | ............... | G06F 40/166 715/236 |
| 7,181,438 B1* | 2/2007 | Szabo | ............... | G06F 21/6245 |
| 8,374,983 B1* | 2/2013 | Pohl | ............... | G06F 16/954 706/46 |
| 8,922,480 B1* | 12/2014 | Freed | ............... | G06F 3/0304 345/156 |
| 9,081,857 B1* | 7/2015 | Huet | ............... | G06F 16/951 |

(Continued)

FOREIGN PATENT DOCUMENTS

| | | | | |
|---|---|---|---|---|
| EP | 1809028 A1 * | 7/2007 | ........... | H04N 7/0885 |
| JP | 2014200002 A * | 10/2014 | ........... | H04N 21/258 |
| WO | WO-2008000179 A1 * | 1/2008 | ......... | H04N 21/4316 |

OTHER PUBLICATIONS

San Pedro et. al. Content Redundancy in YouTube and Its Application to Video Tagging. (Jun. 15, 2011). Retrieved online Jun. 15, 2020. https://dl.acm.org/doi/pdf/10.1145/1993036.1993037 (Year: 2011).*

(Continued)

*Primary Examiner* — James A Reagan
(74) *Attorney, Agent, or Firm* — Fenwick & West LLP

(57) ABSTRACT

An online system enables users to post media content items, comprising images or videos, for display to other users of the system. The online system receives media content from a posting user that is associated with a caption including text content. If the online system detects the text content of the caption includes a string of link text identifying an address, the online system prompts the posting user to pay a fee in exchange for generating a link based on the link text. Responsive to receiving payment of the fee from the posting user, the online system generates the link within the caption. The generated link comprises a selectable object displayed within the caption that when activated by a client device causes the client device to access a digital location specified by the address. The media content item and caption are sent for display to one or more other users of the online system.

19 Claims, 6 Drawing Sheets

(56) References Cited

U.S. PATENT DOCUMENTS

| | | | | |
|---|---|---|---|---|
| 2001/0033297 A1* | 10/2001 | Shastri | G06F 21/62 | 715/741 |
| 2002/0010798 A1* | 1/2002 | Ben-Shaul | H04L 67/1021 | 709/247 |
| 2003/0229893 A1* | 12/2003 | Sgaraglino | H04L 67/36 | 725/37 |
| 2004/0030781 A1* | 2/2004 | Etesse | G09B 5/00 | 709/225 |
| 2004/0128138 A1* | 7/2004 | Andrews | G06F 40/226 | 704/275 |
| 2004/0203768 A1* | 10/2004 | Ylitalo | H04L 67/303 | 455/435.1 |
| 2004/0225966 A1* | 11/2004 | Besharat | G06Q 10/109 | 715/705 |
| 2006/0041549 A1* | 2/2006 | Gundersen | G06F 16/951 | |
| 2007/0239494 A1* | 10/2007 | Stephens | G06Q 10/02 | 705/5 |
| 2008/0010337 A1* | 1/2008 | Hayes | G06Q 10/00 | 709/202 |
| 2008/0313703 A1* | 12/2008 | Flaks | H04L 63/101 | 726/2 |
| 2009/0126026 A1* | 5/2009 | Kim | G06F 21/51 | 726/27 |
| 2010/0082658 A1* | 4/2010 | Athsani | G06F 16/33 | 707/767 |
| 2011/0213670 A1* | 9/2011 | Strutton | G06Q 30/0277 | 705/14.73 |
| 2012/0054369 A1* | 3/2012 | Shafi | G06F 16/972 | 709/246 |
| 2013/0198010 A1* | 8/2013 | Gasperoni | G06Q 30/02 | 705/14.69 |
| 2013/0262476 A1* | 10/2013 | Barak | G06F 16/9577 | 707/748 |
| 2013/0263166 A1* | 10/2013 | Fleischman | H04N 21/2668 | 725/14 |
| 2014/0109132 A1* | 4/2014 | Hasek | H04N 21/8126 | 725/32 |
| 2014/0245346 A1* | 8/2014 | Cheng | H04N 21/23424 | 725/32 |
| 2014/0317654 A1* | 10/2014 | Abed | H04N 7/0882 | 725/32 |
| 2015/0339788 A1* | 11/2015 | Dawson | G09C 5/00 | 705/311 |
| 2016/0055246 A1* | 2/2016 | Marcin | G06F 16/9535 | 707/732 |
| 2016/0092967 A1* | 3/2016 | Akbarpour | G06Q 30/0631 | 705/26.7 |

OTHER PUBLICATIONS

Statz, P. Use Media RSS. (Feb. 15, 2010). Retrieved online Jun. 15, 2020. https://www.wired.com/2010/02/use_media_rss/ (Year: 2010).*

Feng, Yansong. Automatic Caption Generation for News Images. (Aug. 7, 2010). Retrieved online Jun. 15, 2020. http://citeseerx.ist.psu.edu/viewdoc/download?doi=10.1.1.656.6715&rep=rep1&type=pdf (Year: 2010).*

* cited by examiner

ADDING PAID LINKS TO MEDIA CAPTIONS IN A SOCIAL NETWORKING SYSTEM

BACKGROUND

This disclosure relates generally to posted media in social networking systems, and in particular to adding paid links to media captions in a social networking system.

Social networking systems allow users to share content with other users. Some social networking systems enable users to share media content in particular, such as images and videos. When sharing media content, it is often useful for users to add annotations to explain or describe the content item. Thus, social networking systems may enable users to add captions or other types of annotations to images or videos that the users post to the system. Typically, social networking systems do not restrict the content that users can add to captions: while the social networking system may limit the format of the content to text and may limit the amount of text users can enter, the users may be able to enter any desired text with few, if any, other restrictions. In some cases, users may enter link text, such as a uniform resource locator or another type of address specifying a digital location, to direct other users of the social networking system to an external location, such as the user's personal web page. However, freely allowing users to enter link text and generate a corresponding link may result in undesirable captions or promotion of links for a user that are not of interest to other users, and may risk spamming other users with undesirable links. Directing users to web pages or applications outside of the social networking system also reducing user engagement with the social networking system.

SUMMARY

An online system, such as a social networking system, enables users to post media content for display to other users of the system. The media content, which includes, for example, images or videos, is posted to the online system by a posting user and is associated with a caption. The caption includes text content, and may explain or describe the media content. The online system analyzes the text content posted with the media content, and if the online system detects the text content of the caption includes link text, such as a URL, the online system prompts the posting user to pay a fee for generating a link based on the link text. Because such links may provide an alternate method for advertising other than normal advertising channels of the online system, for which the advertiser would normally pay, the fee prevents an advertiser from posting content with a link in the caption as an alternate advertising method without cost to the advertiser, and prevents excessive links by other users of the online system. The fee for generating a link may be a flat fee, or may vary based on a number of other users that are connected to the posting user via the online system, a number of other users that viewed one or more media content items previously posted to the online system by the posting user, or a frequency at which the posting user posts media content to the online system.

The fee may alternatively be based at least in part on the user profile of the user. For example, the online system may charge an entity, such as a business, a fee to generate a link, but may not charge an individual user a fee. When the fee is varied, it may promote the posting of such links by a user with a smaller following, but encourage users with larger followings to use a normal advertising channel for the social online system rather than posting links to a caption of an image. The fee may be small enough to not discourage users from occasionally posting links with their media content, but large enough to disincentivize users from generating links on a mass scale. If the posting user pays the fee or if the online system determines to not charge the posting user a fee, the online system generates the link within the caption. The generated link is a selectable object that, when selected on a user client device, causes the client device to access content associated with the link (e.g., a web page). If the posting user does not pay the fee, the online system may display the link text within the caption, but not as a selectable object or remove the link text entirely. The media content and caption, with or without the link, are displayed to one or more other users of the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online system facilitates user sharing of media content such as images and videos. Users of the online system post media content to the online system with an associated caption describing the item, and the online system displays the content and the caption to other users of the system. To reduce the likelihood of users spamming other users of the system and to keep users engaged with the online system, the online system typically disallows users from adding links to the captions. When the online system detects addition of a link to a caption, the online system permits users to add links to the caption for a fee. When the online system detects that a user has entered link text into an image or video caption, the user is prompted to pay the fee. The online system generates the link corresponding to the link text if the user pays the fee, and disables the link if the user does not pay the fee.

System Architecture

Figure 1:
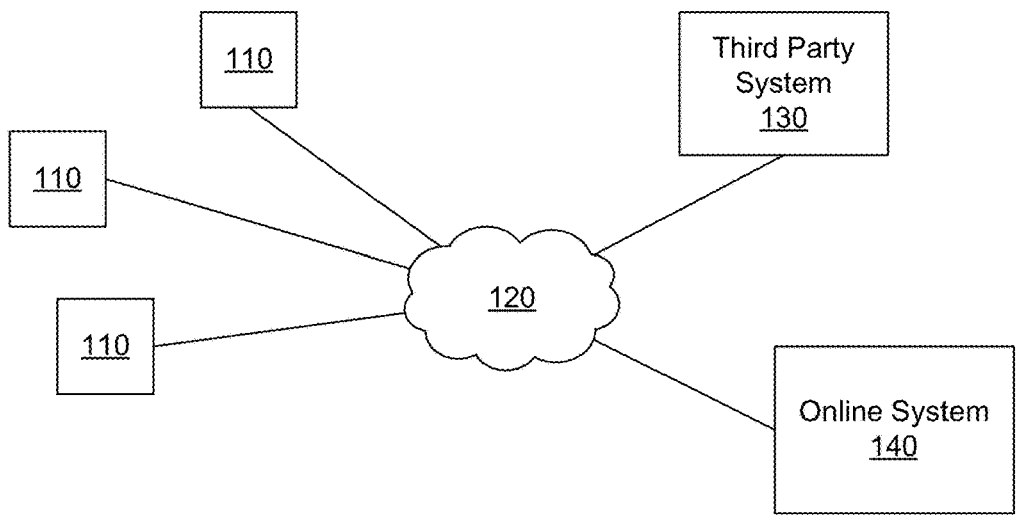
FIG. 1 is a block diagram of a system environment in which an online system operates, in accordance with one embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments are describe herein with respect to an online system with social networking system functionality, but can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In one embodiment, the client device 110 also has camera functionality to capture and/or store image or video data, which the client device 110 can upload to the online system 140 via the network 120.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is a web server providing a website accessible to a client device 110. In other embodiments, a third party system 130 provides content or other information for presentation via a client device 110. A third party website 130 may also communicate information to the online system 140, such as advertisements, content, or information about an application provided by the third party website 130.

Figure 2:
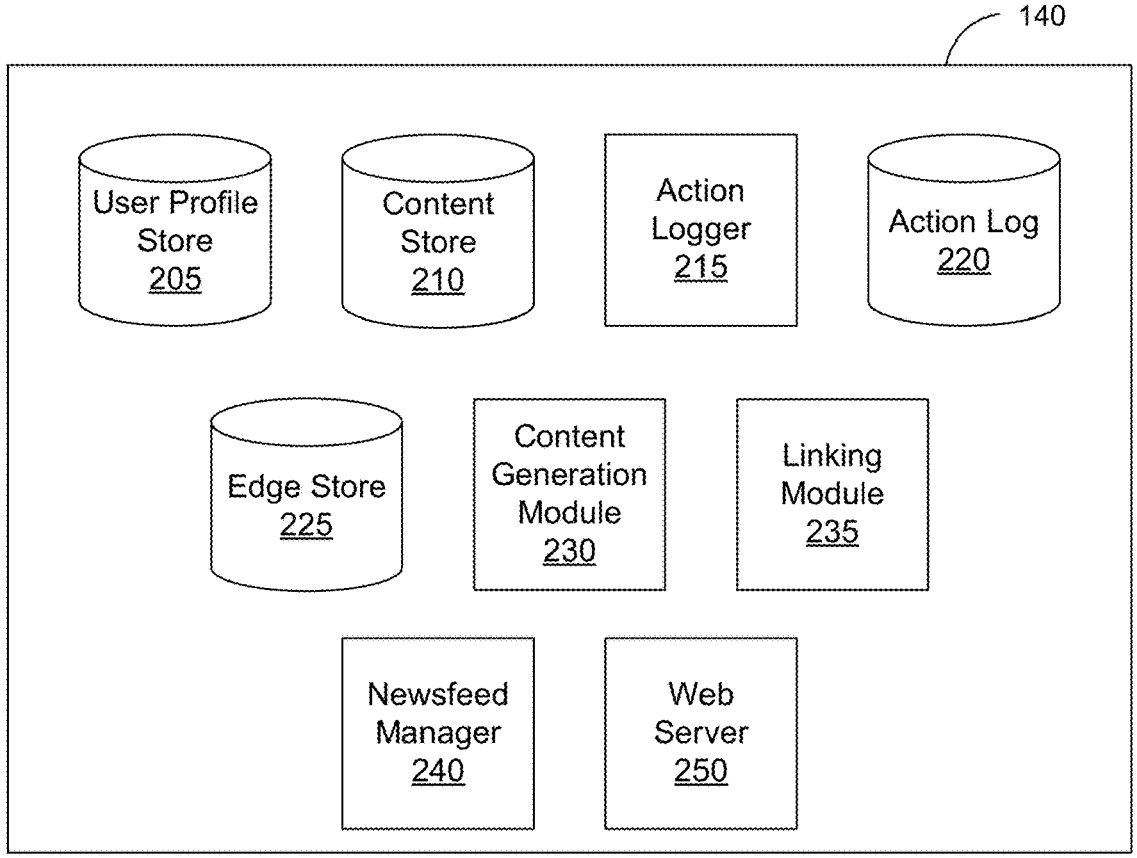
FIG. 2 is a block diagram of an online system, in accordance with one embodiment.

FIG. 2 is an example block diagram of an architecture of the online system 140. The online system 140 shown in FIG. 2 includes a user profile store 205, a content store 210, an action logger 215, an action log 220, an edge store 225, a content generation module 230, a linking module 235, a newsfeed manager 240, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. In one embodiment, the content store 210 stores objects each representing an image or a video and content associated with the image or video, such as a caption, comments or feedback provided by other users, or tags associated with the image or video. However, the content store 210 may store additional types of content, such as a page post, a status update, a link, a shared content item, a gaming application achievement, a check-in event at a local business, a brand page, or any other type of content. Users of the online system 140 may create objects stored by the content store 210, such as capturing an image or a video using a client device 110. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, viewing content associated with another user, or sharing content with another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing posts, accessing content items, and any other interactions. Additional examples of interactions with objects on the online system 140 that are included in the action log 220 include: commenting on a photo album, communicating with a user, establishing a connection with a user, authorizing an application, using an application, expressing a preference for an object ("liking" the object), and engaging in a transaction. Additionally, the action log 220 may record a user's interactions with advertisements and links on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

The edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content generation module 230 facilitates user creation of content items within the online system 140. The content generation module 230 may access content stored on the client device 110 or at an external storage location (e.g., a cloud-based storage service), or enable a user to capture content directly uploaded to the online system 140 without storing the content locally on the client device 110. For example, the content generation module 230 may execute a photo or video application that the user can use to capture an image or a video to post to the online system 140. The content generation module 230 also enables users to edit content posted to the online system 140 before the content is displayed to other users. For example, the content generation module 230 provides tools to add a caption to the image or video, tag users of the online system in the image or video, apply filters or annotations to the image or video, crop and image, set background music for a video, and so forth.

In one embodiment, the content generation module 230 provides a posting workflow to intuitively guide a posting user through a process for uploading content to the online system 140 or creating content within the online system 140. The posting flow may include a series of dialog boxes, prompts, or other tools displayed on the posting user's client device 110 to either select a media content item to upload or capture a new media content item, as well as to add a caption to explain or describe the item. The content generation module 230 stores the content received from the user in the content store 210, and creates a content item for display to other users of the online system 140.

The linking module 235 identifies link text within caption content entered by a user posting content to the online system 140. The link text may include an address specifying a digital location, such as a uniform resource locator (URL) identifying a web location. The link text may additionally include other information, such as encoded instructions for execution by a webpage or application when the address is accessed. When the linking module 235 detects link text within a caption, the linking module 235 determines a fee for generating a link corresponding to the link text. In various embodiments, the linking module 235 determines the fee based on a number of other users that are connected to the posting user via the online system, a number of other users that viewed one or more media content items previously posted to the online system by the posting user, or a frequency at which the posting users posts media content to the online system. The fee may also be determined based on the user profile of the posting user. The fee determined by the linking module 235 may alternatively be a flat fee charged to every user of the online system 140 who adds a link, regardless of the user's number of connections or posting frequency.

The linking module 235 prompts the posting user to pay the determined fee. In one embodiment, the prompt is displayed within the posting flow provided by the content generation module 230, enabling the posting user to easily pay the fee while posting the media content to the online system 140. If the posting user pays the fee, the linking module 235 generates a link corresponding to the link text entered by the user for display within the caption. In one embodiment, the link text is displayed as a selectable object that, when selected by a user of the online system 140 on a client device 110, causes the user's client device 110 to access content associated with the link.

Figure 3A:
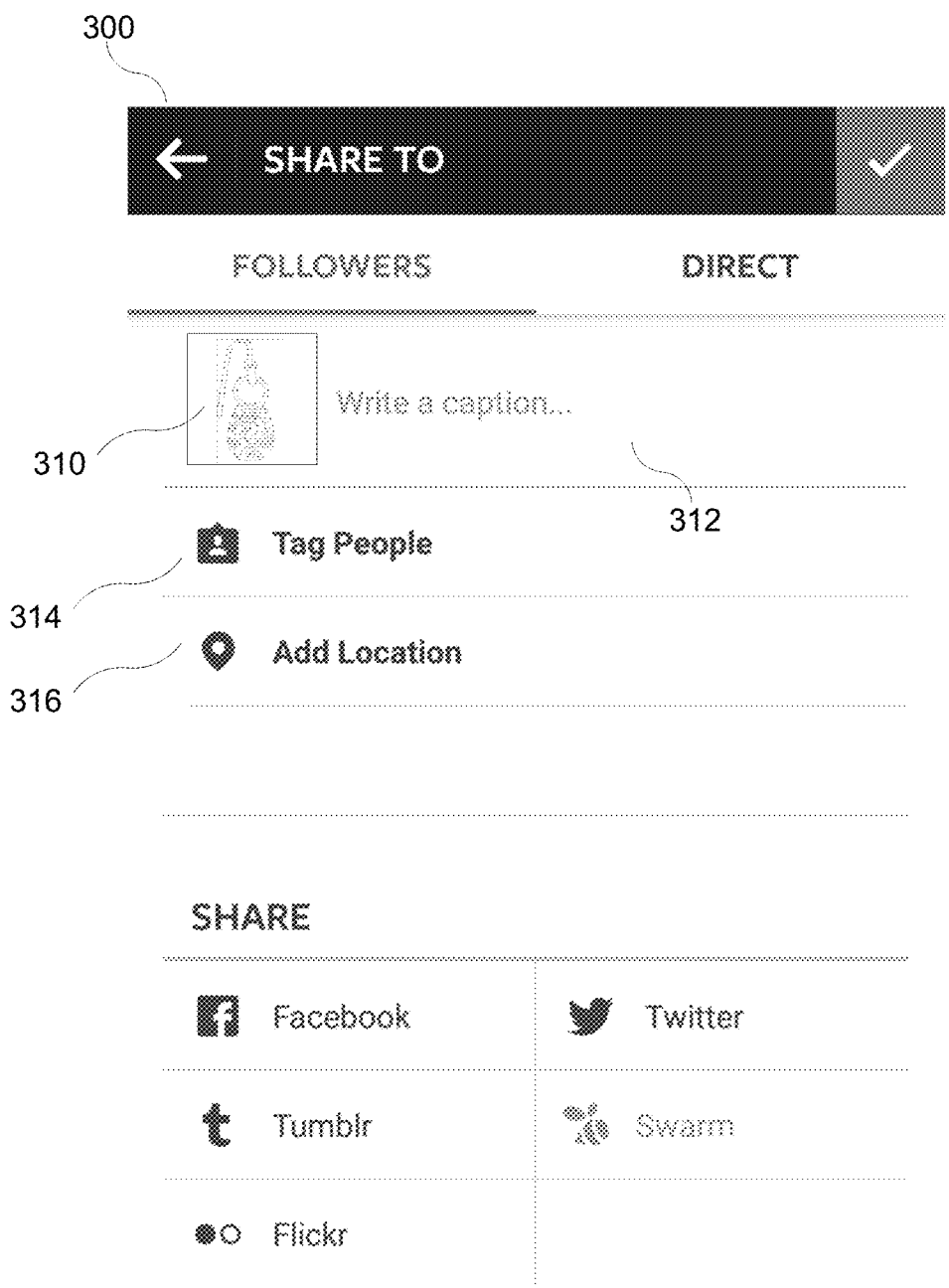
FIGS. 3A-3D illustrate an example posting flow for posting a media content item to the online system, in accordance with one embodiment.
Figure 3B:
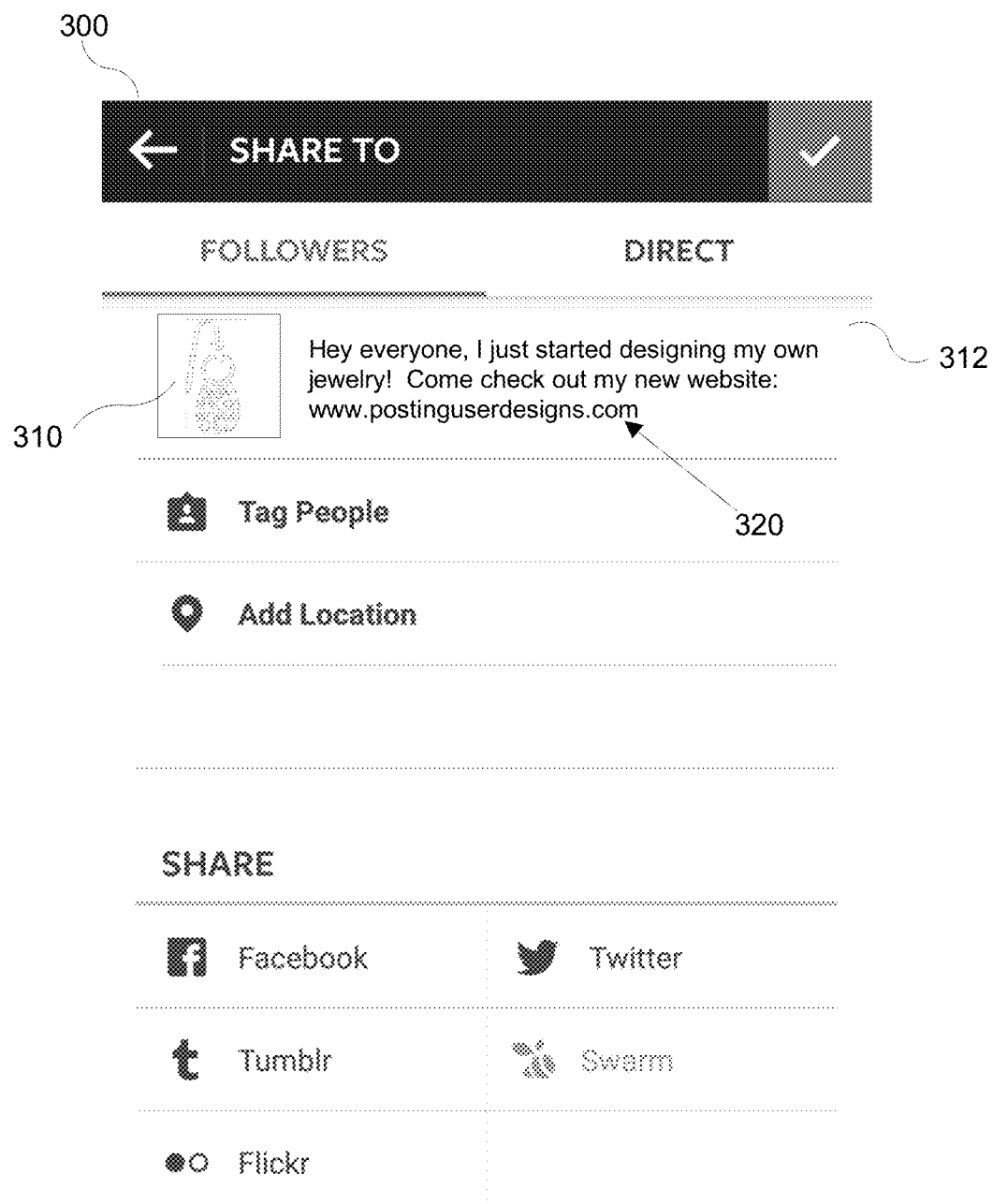
Figure 3C:
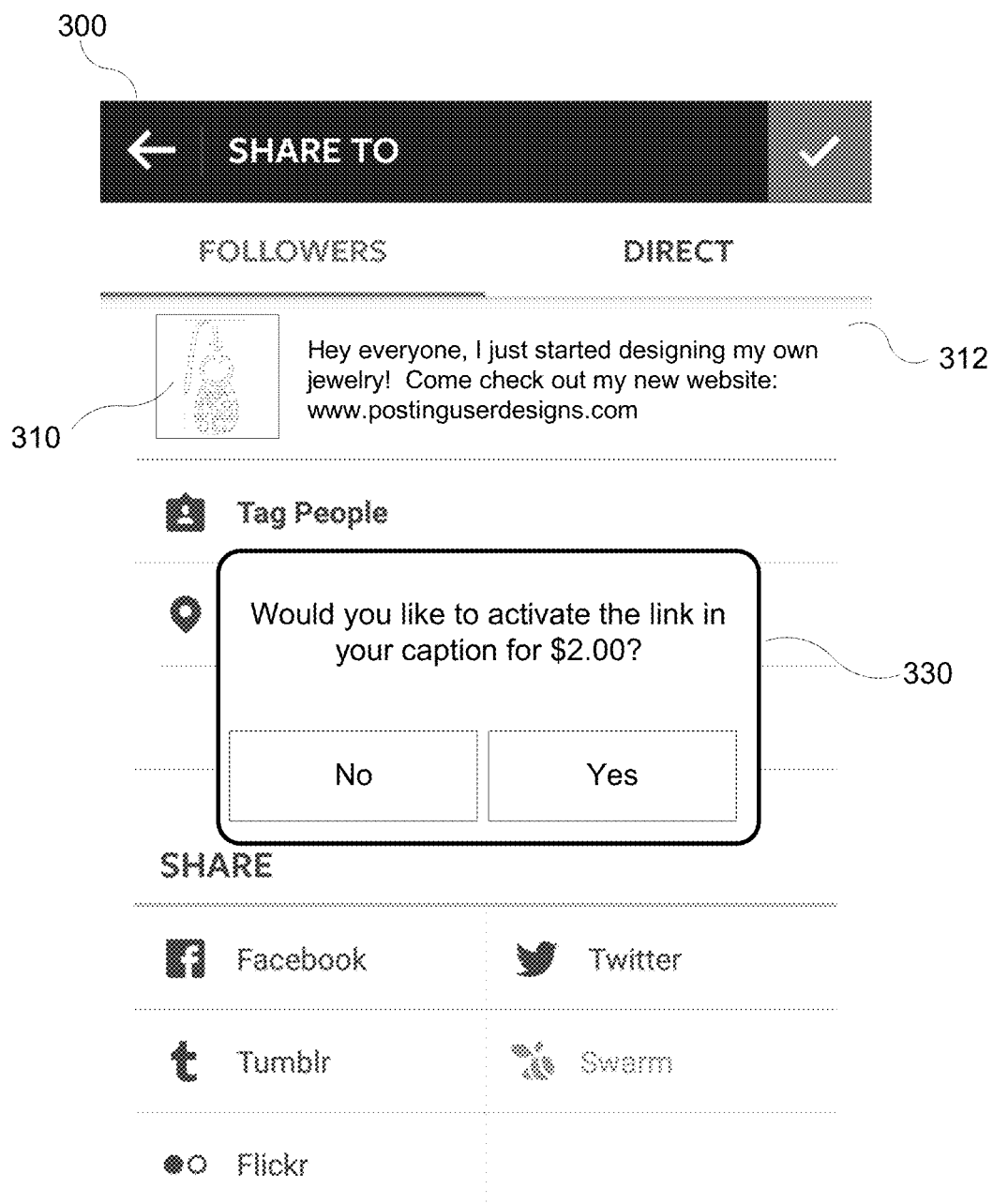
Figure 3D:
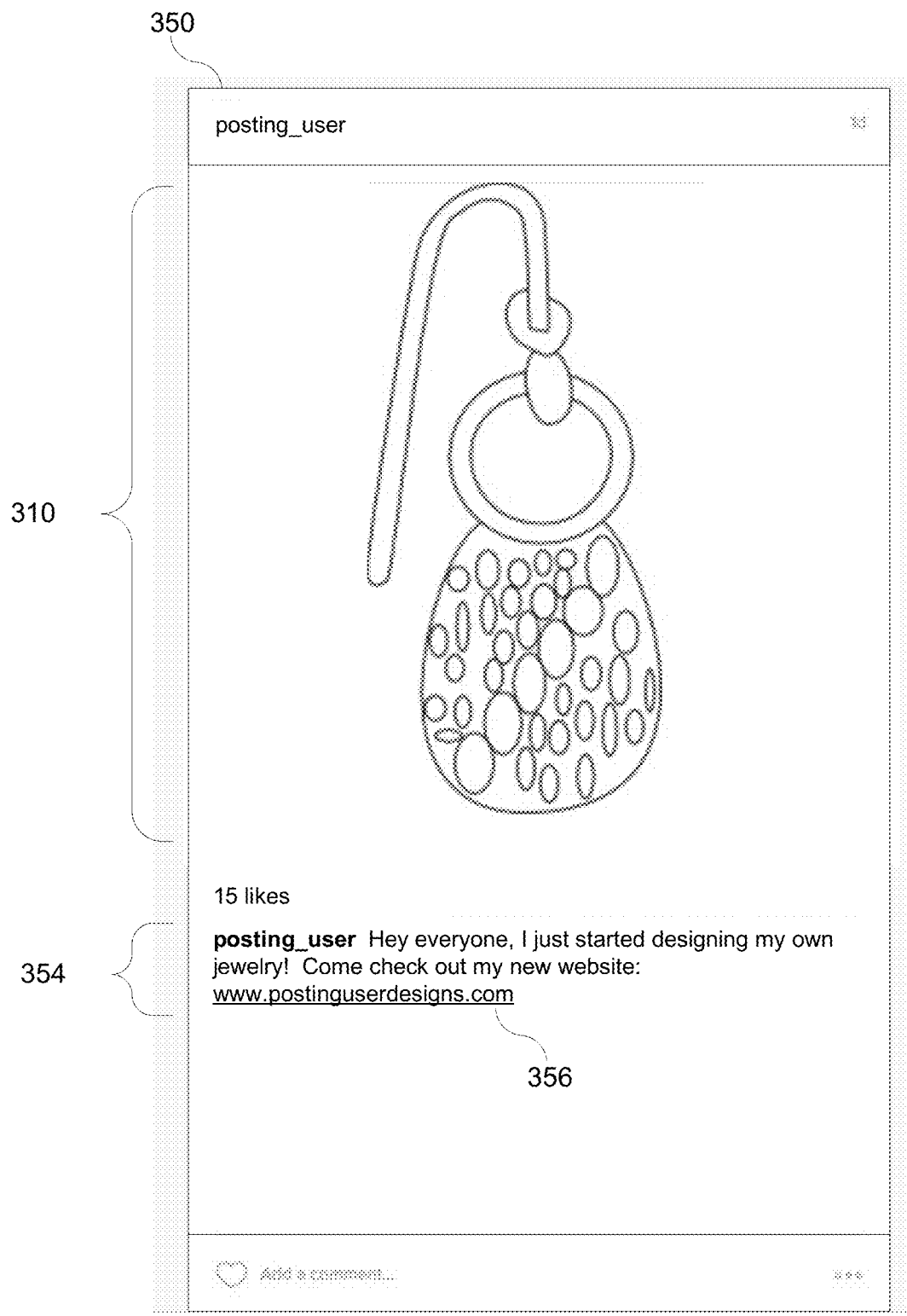

An example posting flow 300 provided by the content generation module 230 and the linking module 235 is shown in FIGS. 3A-3D. As shown in FIG. 3A, the content generation module 230 provides an interface for a user to edit a content item, such as an image 310. For example, the posting flow 300 includes space for a user to enter a caption 312, tag other users 314, and specify a location 316 associated with the media content item. FIG. 3B illustrates that the posting user has entered a caption associated with the image 310, which includes link text 320 (in this case, a URL for the posting user's website). When the linking module 235 detects the link text in the caption, the linking module 235 displays a dialog box 330, shown in the example of FIG. 3C, notifying the user of the fee for generating the link. If the user agrees to pay the fee, the content generation module 230 generates the content item and the caption with a selectable link object, as shown in FIG. 3D. FIG. 3D illustrates an example media content item 350 created by the content generation module 230, which includes the image 310 uploaded by a posting user to the online system 140. The media content item 350 also has a caption 354 including the text entered by the user into box 312 of the posting flow and the link 356 generated by the linking module 235.

In one embodiment, the online system 140 presents content likely to be of interest to a user through a "newsfeed" presented to the user, which includes a plurality of content items. The newsfeed manager 240 may select content from the content store 210 for presentation to a user based on information in the action log 220 and in the edge store 225. For example, the newsfeed manager 240 may generate a newsfeed for a user by selecting images or videos posted to the online system 140 by other users the user is following. As another example, the newsfeed manager 240 may generate a newsfeed for the user by selecting images or videos the other users followed by the user have liked or on which the other users have commented. The newsfeed manager 240 may also determine the order in which selected content items are presented via the newsfeed. For example, the newsfeed manager 240 determines that a user has a highest affinity for a specific user and increases the number of content items in the newsfeed associated with the specific user or modifies the positions in the newsfeed where stories associated with the specific user are presented.

The web server 250 links the online system 140 via the network 120 to the one or more client devices 110, as well as to the one or more third party systems 130. The web server 140 serves web pages, as well as other web-related content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

Generating Paid Links in Captions

Figure 4:
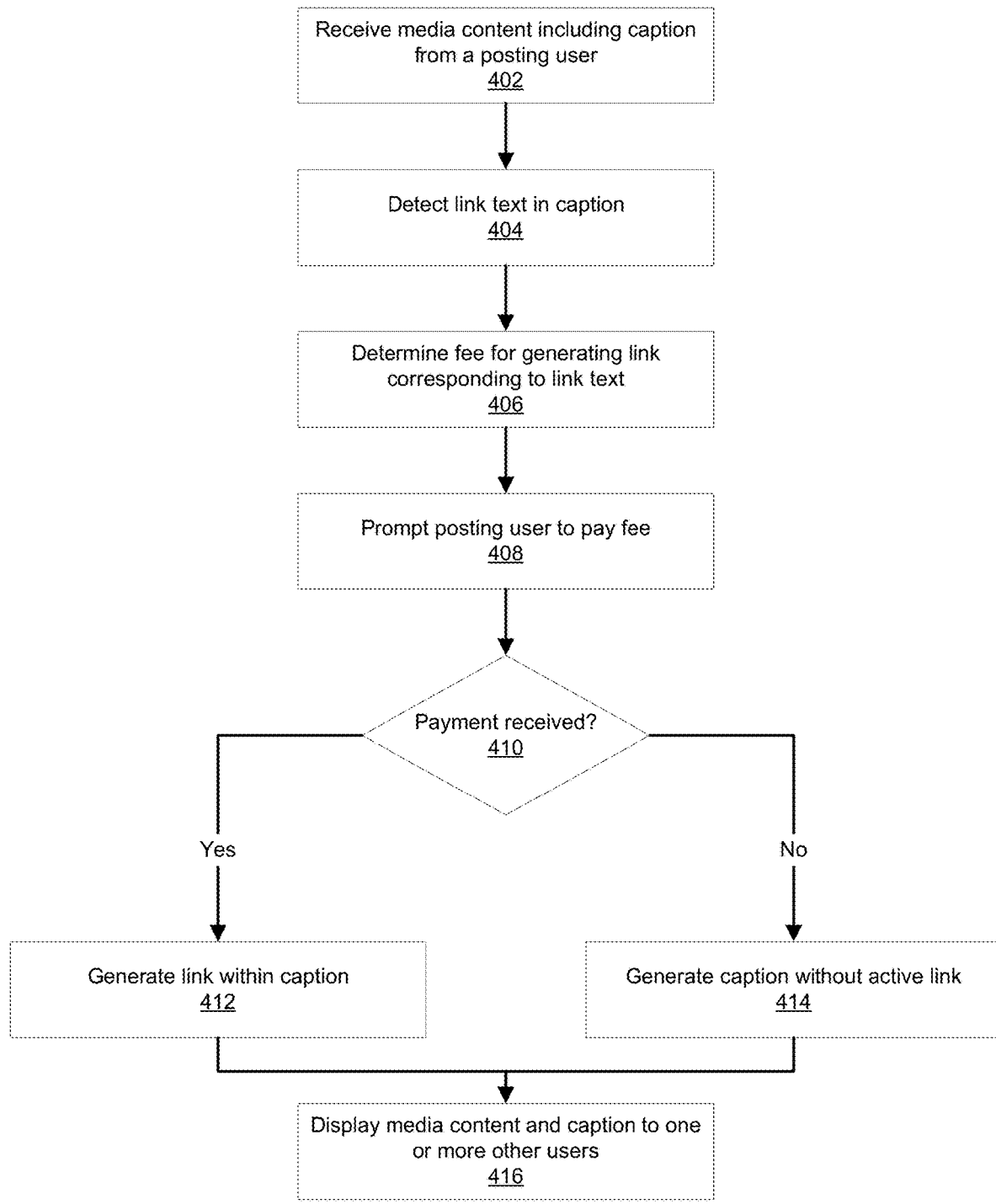
FIG. 4 is a flowchart illustrating a process for generating links within media content captions in an online system, in accordance with one embodiment.

FIG. 4 is a flowchart illustrating a process for generating paid links in captions associated with image or video content in an online system, according to one embodiment. In one embodiment, the process is performed by the online system 140. Other embodiments may include fewer, additional, or different steps, and the steps may be performed in different orders.

The online system 140 receives 402 media content, such as an image or a video, from a posting user. The posting user may upload the media content to the online system 140 stored on a client device 110, or the posting user may use the client device 110 to capture the media content and directly post the content to the online system 140 without storing the content locally on the client device 110. Alternatively, the posting user may use the client device 110 to access a remote storage location, such as a cloud storage service, to retrieve the media content to post to the online system 140. While posting the media content, the posting user may add a caption including textual content associated with the media content. The textual content may include link text, corresponding to a link the posting user desires to add to the caption.

If the caption entered by the posting user includes link text, the online system 140 detects 404 the link text in the caption. To detect 404 the link text, the online system 140 may search the text for substrings expected to be part of an address, such as "http" or "www." If an address substring is identified, the online system 140 may identify the entire string of text including the substring, until the next character space, as the link text. The online system 140 may alternatively use other methods to detect the link text.

When link text is detected in a caption, the online system 140 determines 406 a fee for generating a link corresponding to the link text. In one embodiment, the fee is a flat fee that does not vary between users of the online system 140 or based on actions of the users. In another embodiment, the online system 140 determines 406 the fee based on the number of users connected to the posting user via the online system 140. The fee may be calculated by an equation relating the number of users connected to (or "following") the posting user to a fee amount for generating the link, where the equation includes a linear relationship, an exponential relationship, or another type of relationship. For example, the online system 140 may determine a fee F for generating a link using the equation $F=\alpha U$, where U is the number of users following the posting user in the online system 140 and a is a scalar. As another example, the online system 140 may charge a first fee amount if the posting user has between zero and 100 followers, a second fee amount greater than the first fee amount if the posting user has between 100 and 1000 followers, a third fee amount greater than the second fee amount if the posting user has between 1000 and 10,000 followers, and so forth. Alternatively, the online system 140 determines 406 the fee using a similar equation, but instead using the number of users of the online system 140 that viewed or interacted with (e.g., commented on or liked) one or more previous media content items posted by the posting user. For example, the online system 140 may determine the number of users who viewed or interacted with the most recent previous post by the posting user or a previous post similar to the new post, or may compute an average number of users who viewed or interacted with any media content items posted within a specified time period (e.g., the last month).

In yet another embodiment, the online system 140 determines 406 the fee based on the frequency at which the posting user posts content to the online system 140. The online system 140 may determine a frequency at which the posting user has posted content in the past by, for example, dividing the number of content items the posting user has posted within a specified interval of time (e.g., the last year) by the length of the interval. The determined frequency may then be input to a formula relating the fee to the user's posting frequency, which may be a linear relationship, an exponential relationship, or another type of relationship. For example, the online system 140 may determine a first fee amount if the posting user posts, on average, between once every two weeks and once a day, and determines a second fee amount greater than the first fee amount if the posting user posts more or less frequently. Alternatively, the online system 140 may determine the fee based on the posting user's posting frequency by increasing the fee for each link the posting user desires to create. For example, the first link generated by the posting user has a fee of $2, the second link has a fee of $3, the third link has a fee of $4, and so forth. The online system 140 may alternatively not charge a particular posting user a fee until the user has added a threshold quantity of links or exceeds a threshold frequency of adding links. For example, the online system 140 may not charge a user to generate a link once a week, but may charge the user a fee for any additional links the user generates during a week.

The online system 140 may additionally or alternatively determine the fee based on the user profile of the posting user. For example, the online system 140 may determine a non-zero fee for entities (such as businesses) and may not charge a fee for individual users to generate links, or may charge a different fee for individual users than for entities.

The online system 140 prompts 408 the posting user to pay the determined fee. In one embodiment, the prompt is provided within the content posting flow provided by the online system 140. For example, the prompt to pay the fee is displayed in a dialog box provided while the posting user is posting the media content to the online system 140. If the user desires to pay the fee to generate the link within the caption, the online system 140 may receive payment in any of a variety of ways. In one embodiment, the user can pay the fee through an application payment portal (such as the PLAY Store by Google, Inc. or the ITUNES Store by Apple, Inc.), without needing to exit the online system application or enter payment information. If the online system 140 receives 410 the payment from the user, the online system 140 generates 412 the link within the caption. The link may be a selectable object within the displayed caption that, when selected by a user of the online system 140 on a client device 110, causes the user's client device 110 to access content associated with the link (such as a web page). For example, if the link is a URL of a web page hosted by a third party system 130, selection of the link causes the client device 110 to access the web page. As another example, if the link is a deep link into the online system 140 application or another application executing on the client device 110, selection of the link causes the client device 110 to access the specified application and cause the application to execute a specified task.

If the online system 140 does not receive 410 the payment from the posting user, the online system 140 may generate 414 the caption without an active link. For example, the caption may include the link text entered by the user, but the link text is not a selectable object. The online system 140 may alternatively generate the caption without the link text. The online system 140 displays 416 media content and caption to one or more other users.

By generating links within captions when a posting user pays a fee, the online system 140 beneficially enables users to generate links while reducing spam. The fee may be small enough to not discourage users from occasionally posting links with their media content, but large enough to disincentivize users from generating links on a mass scale. For example, a small business that does not have the resources for a large advertising campaign can post media content with links to their website to market their products to users of the online system 140, but the fee would disincentivize a large business from bypassing normal advertising channels to instead advertise by posting links within captions. The fee charged by the online system 140 is also a low barrier to entry for advertising, and may encourage more users to begin advertising with the online system 140.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   providing a posting interface to a posting user of an online system to post content for distribution to users in a newsfeed of the online system, the posting interface providing an interface element for a media content item and a space for the posting user to enter a caption for describing the media content item, the caption configured to receive textual input;
   receiving a media content item from the posting user of the online system, the media content item comprising an image or a video and a caption including text content;
   identifying a substring of the caption indicative of a web address, wherein the substring is a portion of a link text, and the link text is a portion less than all of the caption input by the posting user;
   responsive to identifying the substring, identifying a remaining portion of the link text including additional characters adjacent to the substring until a next character space;
   prompting the posting user to pay a fee in exchange for generating a link based on the link text;
   responsive to receiving payment of the fee from the posting user, generating the link within the caption, the generated link comprising a selectable object within the caption that when activated by a client device causes the client device to access a digital location specified by the address;
   receiving a request for newsfeed content from another user connected to the posting user;
   ranking the media content item with other content items provided by connections of the other user, the ranking based on the other user's interactions with content in the online system;
   selecting the media content item based on the ranking for presentation to the other user in the newsfeed; and
   sending the media content item and caption for display to the other user in a newsfeed of content items, thereby preventing the media content item and caption from circumventing an advertising channel of the online system.

2. The method of claim 1, further comprising determining the fee based at least in part on a user profile associated with the posting user.

3. The method of claim 1, wherein a plurality of other users of the online system are connected to the posting user via the online system to receive content posted by the posting user, and wherein the method further comprises:
   identifying a number of the other users of the online system that are connected to the posting user; and
   determining the fee based on the number of connected users.

4. The method of claim 3, wherein the fee for a user connected to a larger number of users is higher than the fee for a user connected to a smaller number of users.

5. The method of claim 1, further comprising:
   identifying a frequency at which the posting user posts media content to the online system; and
   determining the fee based on the identified frequency.

6. The method of claim 5, wherein the fee for a user who posts media content items more frequently is higher than the fee for a user who posts media content items less frequently.

7. The method of claim 1, further comprising:
   identifying a number of users of the online system who viewed one or more previous media content items posted by the posting user; and
   determining the fee based on the identified number of users.

8. The method of claim 7, wherein the fee is higher for a user whose one or more previous media content items were viewed by a greater number of other users than the fee for a user whose one or more media content items were viewed by a smaller number of other users.

9. The method of claim 1, wherein the displayed caption includes the link text as a disabled link responsive to not receiving the payment of the fee.

10. The method of claim 1, wherein the link text comprises a uniform resource locator (URL), and wherein the generated link is selectable to access a web page using the URL.

11. The method of claim 1, wherein the link text comprises a deep link to a location within an application associated with the online system, and wherein the generated link is selectable to access the location within the application.

12. The method of claim 1, wherein the substring includes http or www.

13. A non-transitory computer readable storage medium storing computer program instructions, the instructions when executed by a processor causing the processor to:
   provide a posting interface to a posting user of an online system to post content for distribution to users in a newsfeed of the online system, the posting interface providing an interface element for a media content item and a space for the posting user to enter a caption for describing the media content item, the caption configured to receive a textual input;
   receive a media content item from the posting user of the online system, the media content item comprising an image or a video and associated with a caption including text content;
   identify a substring of the caption indicative of a web address, wherein the substring is a portion of a link text, and the link text is a portion less than all of the caption input by the posting user;

responsive to identifying the substring, identify a remaining portion of the link text including additional character adjacent to the substring until a next character space;

prompt the posting user to pay a fee in exchange for generating a link based on the link text;

responsive to receiving payment of the fee from the posting user, generate the link within the caption, the generated link comprising a selectable object within the caption that when activated by a client device causes the client device to access a digital location specified by the address; and receive a request for newsfeed content from another user connected to the posting user;

rank the media content item with other content items provided by connections of the other user, the ranking based on the other user's interactions with content in the online system;

select the media content item based on the ranking for presentation to the other user in the newsfeed; and send the media content item and caption for display to the other user in a newsfeed of content items.

14. The non-transitory computer readable storage medium of claim 13, further comprising determining the fee based at least in part on a user profile associated with the posting user.

15. The non-transitory computer readable storage medium of claim 13, wherein a plurality of other users of the online system are connected to the posting user via the online system to receive content posted by the posting user, and wherein the instructions when executed by the processor further cause the processor to:
    identify a number of the other users of the online system that are connected to the posting user; and
    determine the fee based on the number of connected users.

16. The non-transitory computer readable storage medium of claim 13, wherein the instructions when executed by the processor further cause the processor to:
    identify a frequency at which the posting user posts media content items to the online system; and
    determine the fee based on the identified frequency.

17. The non-transitory computer readable storage medium of claim 13, wherein the instructions when executed by the processor further cause the processor to:
    identify a number of users of the online system who viewed one or more previous media content items posted by the posting user; and
    determine the fee based on the identified number of users.

18. The non-transitory computer readable storage medium of claim 13, wherein the displayed caption includes the link text as a disabled link responsive to not receiving the payment of the fee.

19. The non-transitory computer readable storage medium of claim 13, wherein the link text comprises one of a uniform resource locator (URL) and a deep link to a location within an application associated with the online system.

* * * * *